United States Patent [19]

Riley et al.

[11] Patent Number: 5,000,630

[45] Date of Patent: * Mar. 19, 1991

[54] BIT FOR FORMING HOLES IN COMPOSITE MATERIALS

[75] Inventors: A. Douglass Riley; Rene F. DeFries, both of Manitoba, Canada

[73] Assignee: The Boeing Company, Seattle, Wash.

[ * ] Notice: The portion of the term of this patent subsequent to Jan. 19, 2005 has been disclaimed.

[21] Appl. No.: 297,944

[22] Filed: Jan. 17, 1989

[51] Int. Cl.⁵ .............................................. B23B 51/08
[52] U.S. Cl. ..................................... 408/228; 408/22; 408/144; 407/1; 51/181 R
[58] Field of Search ................... 408/144, 145, 30, 22, 408/199, 225, 224, 223; 166/55, 55.2; 51/5 C, 5 S, 181 P; 407/1; 29/33 T

[56] References Cited

U.S. PATENT DOCUMENTS

| | | | |
|---|---|---|---|
| 456,258 | 7/1891 | Hutton et al. | |
| 1,730,650 | 10/1929 | Evans | 51/5 E X |
| 2,640,379 | 6/1953 | Graves | 408/228 |
| 2,715,772 | 8/1955 | Fritz | 32/48 |
| 3,076,356 | 2/1963 | Simich | 77/67 |
| 3,429,171 | 2/1969 | Feher | 72/325 |
| 3,592,555 | 7/1971 | Mackey | 408/225 |
| 3,688,386 | 9/1972 | Pereira | 29/558 |
| 3,795,957 | 3/1974 | Steusloff | 408/22 X |
| 3,836,278 | 9/1974 | McInnes | 408/199 |
| 4,091,525 | 5/1978 | Karasiewicz et al. | 407/1 |
| 4,093,395 | 6/1978 | Luebbert et al. | 408/224 |
| 4,285,620 | 8/1981 | Luebbert et al. | 408/212 |
| 4,440,532 | 4/1984 | D'Apuzzo | 408/229 |
| 4,507,028 | 3/1985 | Matsushita | 408/230 |
| 4,560,309 | 12/1985 | Hornsby | 408/229 |
| 4,577,388 | 3/1986 | Wood | 409/143 X |
| 4,720,218 | 1/1988 | DeFries et al. | 408/145 |
| 4,725,171 | 2/1988 | DeTorre | 408/213 |

FOREIGN PATENT DOCUMENTS 235348 6/1911 Switzerland ........................ 408/199

OTHER PUBLICATIONS

NASA Tech. Briefs, Fall 1980, p. 368, "Abrasive Drill for Resilient Materials".

Primary Examiner—Z. R. Balinsky
Assistant Examiner—Robert Schultz
Attorney, Agent, or Firm—Joan H. Pauly

[57] ABSTRACT

A bit (12) has a triangular drill portion (14), a frustoconical grinder portion (24), and a cylindrical reamer portion (28). The drill portion (14) has three longitudinal cutting edges (16) that define the angles of its triangular cross section. The grinder portion (24) extends axially inwardly from the drill portion (14) and has a minimum diameter less than and a maximum diameter greater than the maximum diameter of the drill portion (14). The reamer portion (28) is an axial continuation of the grinder portion (24). The outer surfaces of the grinder and reamer portions (24, 28) are plated with diamond grit (30) to enlarge and finish a hole produced by the drill portion (14). The relative diameters allow the grinder portion (24) to gradually engage the sidewall of a hole. The bit (12) is supported and centered in the hole by three point contact between the cutting edges (16) and the hole sidewall.

3 Claims, 2 Drawing Sheets

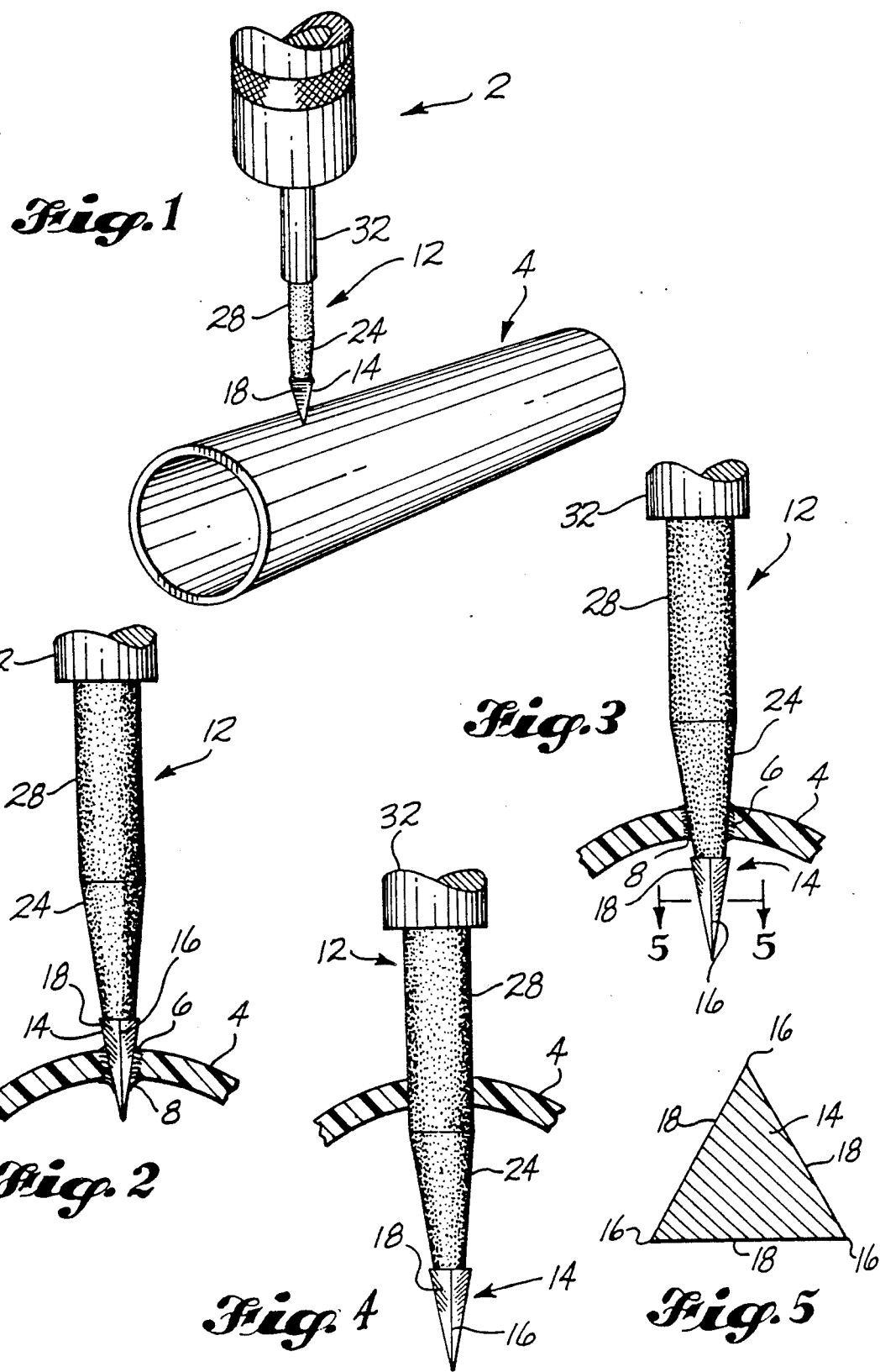

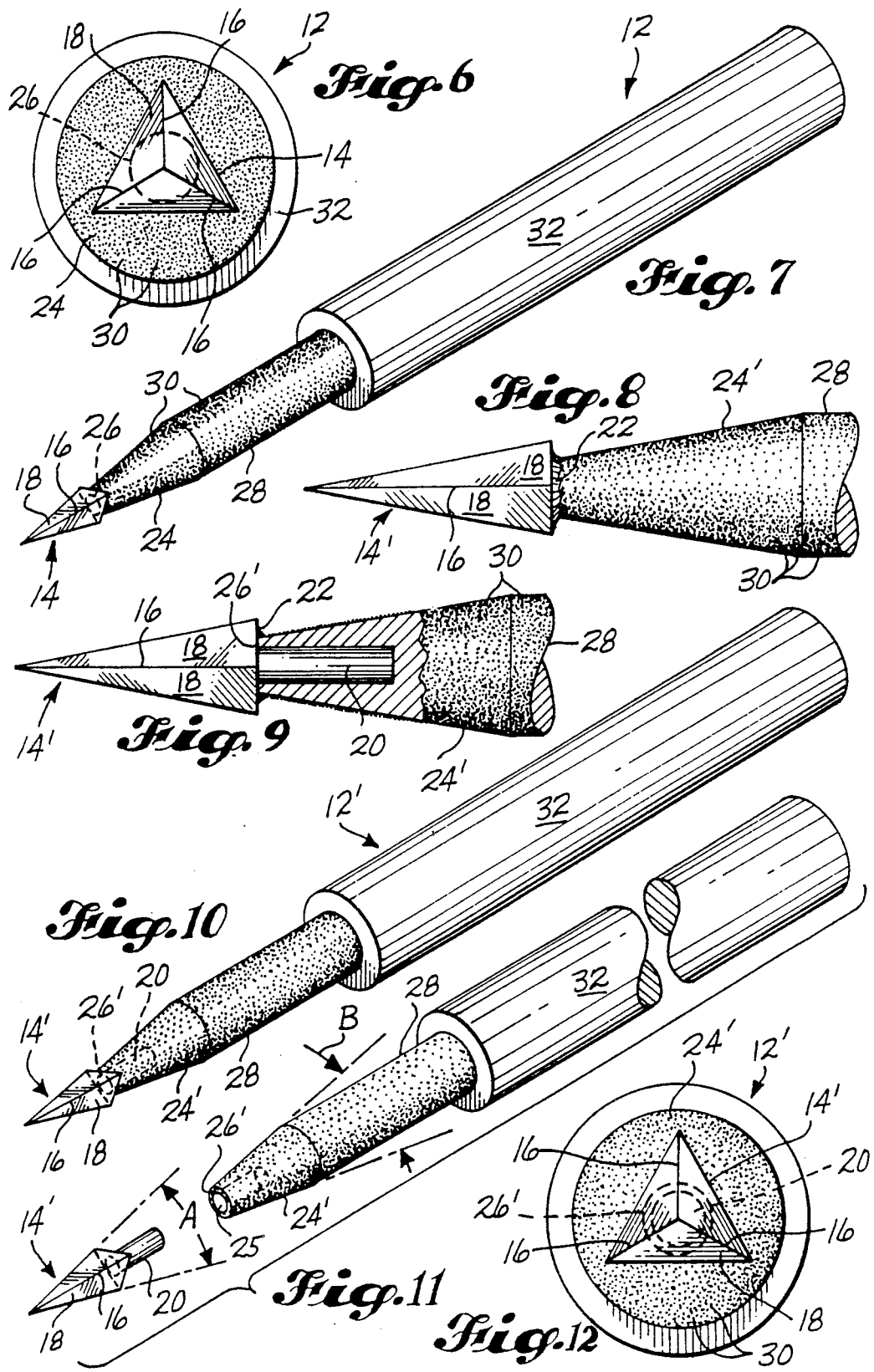

BIT FOR FORMING HOLES IN COMPOSITE MATERIALS

TECHNICAL FIELD

This invention relates to bits for drilling and dressing holes and, more particularly, to a combination bit having a pointed tapered triangular outer end for producing a hole and an abrasive frustoconical surface for enlarging the hole, with the diameter of the outer end being wider than the abrasive surface at their interface for gradual engagement of hole sidewalls by the abrasive surface.

BACKGROUND ART

In the aircraft industry, the use of lightweight fiber reinforced composite materials has been steadily increasing over the past few years. As the use of such materials expands, there will be an increased need for a cost effective method of producing high quality holes in such materials with dimensions within narrow tolerances. A number of problems arise in using known drilling and grinding techniques to produce holes in fiber reinforced composite materials. These problems include delamination and splintering of the material and fiber breakout. Such phenomena are unacceptable in most applications for a number of reasons, including weakening of the structure through which the hole extends around the hole area.

The problems discussed above were addressed in a prior patent application of the present applicants, now U.S. Pat. No. 4,720,218, granted Jan. 19, 1988. The patent discloses three embodiments of a combination drilling and dressing bit that was developed to produce holes in fiber reinforced composite materials, such as graphite fiber reinforced bismaleimide (BMI). More specifically, the combination bit was developed to drill holes in cargo heat duct tubes made from graphite reinforced BMI. The disclosure of the patent is incorporated herein by reference, and the combination bits described in the patent will only be briefly described herein.

Each of the three embodiments of the bit disclosed in the patent has a pointed tapered drill portion for producing a hole, a frustoconical grinder portion for enlarging the hole, and a cylindrical reamer portion for finishing the hole. In one embodiment, the drill portion and the grinder portion together form a substantially continuous taper. In another embodiment, the inner end of the drill portion is wider than the outer end of the frustoconical grinder portion to permit the grinder portion to gradually engage the sidewall of a hole being drilled. The drill portion in each of these two embodiments has four flat faces which meet along four edges. Each of the four edges may be sharp to form a cutting edge, as described in the patent. Alternatively, the drill portion may be wider between two opposite edges than between the other two edges so that these opposite edges do all of the actual cutting. This arrangement helps avoid the problem of precisely dimensioning the drill portion so that all four edges make contact and participate in the cutting.

The third embodiment disclosed in the patent has a flattened drill portion with two major faces and two minor faces forming a cross section in the shape of a parallelogram. The two opposite edges which define the widest part of the drill portion do the cutting. The positioning of these edges can be seen in FIG. 8 of the patent.

The combination bits disclosed in the patent and briefly described herein worked well for their intended purpose, i.e., for drilling holes in cargo heat duct tubes. However, problems were encountered with the use of these bits when it was attempted to scale down the bits to drill much smaller holes. The smaller holes were required in the development of composite material anti-icing ducts. In such ducts, holes with diameters of about 0.141 inch, for example, are required. Attempts to scale down the most preferred embodiment disclosed in the patent, the embodiment with the flattened drill portion, by making the drill portion longer were unsuccessful. The elongated tip was too thin and fragile. When used to drill small holes, the patented combination bits also presented the problem of excessive vibration which in turn caused excessive wear of the bits and poor quality holes.

U.S. Pat. No. 2,715,772, granted Aug. 23, 1955, to A. Fritz, discloses a dental burr for drilling root canals. The patent addresses problems encountered in connection with previous dental burrs, including clogging of longitudinal grooves, short useful life, and holes that do not fit the root pin after the burr is sharpened. The Fritz burr has an obtuse-angled pyramid point and a cutting portion with cutting edges that extend parallel to the burr axis and then taper toward the point. The cutting portion has a generally triangular cross section with concave sides. This arrangement allows the cutting portion to continue drilling holes sized to tapered root pins even after resharpening. The concave faces allow dentists to resharpen the burr themselves.

U.S. Pat. No. 456,258, granted July 21, 1891, to D. B. Hutton et al., discloses a drill for drilling square holes. The drill has a triangular shank with radial cutting edges formed by bevelling the end of the shank. The shank has rounded sides to prevent jarring experienced with flat-sided drills. U.S. Pat. No. 3,429,171, granted Feb. 25, 1969, to J. J. Feher, discloses a drill for piercing and extruding sheet metal. The drill has a tapering terminal end portion that is free of edges which would effect a cutting action in a manner such to remove material. The absence of cutting edges allows the drill to form a protrusion on the back side of the sheet metal to increase the extent of the hole and thereby provide a better grip for a fastener. The end portion is described as being conical or having a generally triangular or some other cross-sectional shape as long as it is free of edges that would effect cutting.

U.S. Pat. No. 4,507,028, granted Mar. 26, 1985, to M. Matsushita, discloses a cutting tool with a front drill part and a rear reamer part. Both parts include a pair of twist drill flutes. In one embodiment, the flutes are continuous between the parts, and the parts apparently have the same diameter. In another embodiment, the parts are separated by a neck, and the reamer part has a chamfer to ream within the finishing allowance left by the drill part and a generally cylindrical portion for finishing the hole. The diameter of the cylindrical portion is apparently essentially the same as the diameter of the drill part. A third embodiment is in the form of a step drill with two drill parts and two reamer parts, all with different diameters.

U.S. Pat. No. 4,091,525, granted May 30, 1978, to C. Karasiewicz et al., discloses a reamer for fine reaming of ports. The reamer has a blunt tapered working portion with cutting blades and a tapered rear guiding portion with longitudinally extending smoothing inserts. The working portion has longitudinal flutes and five cutting blades. The edges of the blades and the inserts in the guiding portion lie on the surface of an imaginary cone.

Drills for producing holes in composite materials are disclosed in U.S. Pat. Nos. 4,093,395, granted June 6, 1978, to W. K. Luebbert et al ; U.S. Pat. No. 4,285,620, granted Aug. 25, 1981, to W.K. Luebbert et al.; U.S. Pat. No. 4,440,532, granted Apr. 3, 1984, to S. D'Apuzzo; and U.S. Pat. No. 4,725,171, granted Feb. 16, 1988, to R. P. DeTorre. The D'Apuzzo drill bit has three semicircular longitudinal grooves between three cutting elements. The tip of the bit is blunt and has three nearly radial cutting edges. An additional three curved cutting edges are defined by the grooves. The radial cutting edges perforate the material and the curved cutting edges ream the hole to full size. The earlier Luebbert et al. drill has a flattened cutting tip with two major faces, two minor faces, and two cutting edges. The later Luebbert et al. drill is in the form of a two-fluted twist drill or straight fluted drill with two cutting edges on the end to scribe a circle and two longitudinal or spiral cutting edges to cut away the core of the hole. The DeTorre drill has a tapering planar eliptical end surface and a radial flute that decreases in the axial direction.

Cutting tools with generally cone-shaped tips and single cutting edges formed by a slot are disclosed in U.S. Pat. Nos. 3,076,356, granted Feb. 5, 1963, to E. Simich; and U.S. Pat. No. 3,836,278, granted Sept. 17, 1974, to A. G. P. McInnes. U.S. Pat. No. 4,560,309, granted Dec. 24, 1985, to C. R. Hornsby, discloses a tapered finishing reamer with two opposite longitudinally-extending teeth. U.S. Pat. No. 3,688,386, granted Sept. 5, 1972, to A. J. Pereira, discloses a method of forming holes in contact lenses which employs a five-sided reamer.

DISCLOSURE OF THE INVENTION

The subject of the present invention is a bit for forming holes. According to an aspect of the invention, the bit comprises a pointed tapered drill portion and a grinder portion. The drill portion includes three longitudinal cutting edges for producing a hole. The drill portion has, at each point along its axial extent, an essentially equilateral triangular cross section with three angles defined by the cutting edges. The drill portion has a first maximum diameter and an axially inner end with a diameter equal to this first maximum diameter. The grinder portion includes generally frustoconical abrasive outer surface portions that extend generally axially inwardly from the drill portion for enlarging the hole. The grinder portion has a second maximum diameter larger than the first maximum diameter. The grinder portion increases in diameter from a minimum diameter less than the first maximum diameter radially adjacent to the inner end of the drill portion, to its second maximum diameter, to cause the abrasive outer surface portions of the grinder portion to gradually engage sidewalls of holes.

The bit preferably further comprises a reamer portion including essentially cylindrical abrasive outer surface portions that are axially inward continuations of the abrasive outer surface portions of the grinder portion for finishing the hole. This preferred feature allows the complete process of producing, enlarging, and finishing a hole to be performed with a single economical bit in a single drilling operation.

Another preferred feature of the bit is a cross section that has straight sides between the angles defined by the cutting edges. The straight sides of the cross section are formed by flat faces of the drill portion between the cutting edges. The flat faces have the advantage of helping to maximize the ease of manufacture of the bit.

The bit of the invention solves the problem discussed above of providing a bit capable of drilling holes of relatively small diameter in fiber reinforced composite materials. The triangular configuration of the drill portion of the bit is of sufficient strength so that the problem of excessive fragility experienced in relation to flattened drill portions is avoided. The three cutting edges on the drill portion form a triangle inside the hole being drilled, and thus support the bit at three points and automatically center the bit. The centering of the bit reduces the amount of vibration during the drilling process. The reduced vibration in turn enhances the quality of the hole produced and further increases the durability of the drill portion provided by the triangular configuration. In addition, the three cutting edges on the drill portion increase the cutting surface over the surface provided by drill portions with two working cutting edges and thereby further increase the life of the bit.

In the bit of the invention, the useful life of the bit has been increased to such a degree that the bit can economically be used as a throw-away part that does not require sharpening. The disposability of the bit provides labor cost savings since labor time required to remove, sharpen, and reinstall the drill portion is eliminated. The bit of the invention is relatively simple in structure and easy to manufacture. Therefore, it provides an economical and reliable means for consistently producing high quality holes of various sizes in composite material structures.

The automatic centering accomplished by the bit of the invention can theoretically be achieved by bits having four or more cutting edges. However, it is extremely difficult to achieve the centering with this number of cutting edges since the centering would require extremely precise dimensioning of the drill portion. Even small variations in the evenness of the drill portion would prevent reliable contact between the sidewall of the hole and each of the edges and, thus, would lead to vibrating. With a triangular configuration, minor irregularities in the configuration of the drill portion can be tolerated and are automatically compensated so that the drill portion is always supported at three points and centered.

The combination of the drill portion and the frustoconical grinder portion which is narrower than the drill portion at their interface provides a single tool for producing and enlarging a hole and ensures smooth engagement of the hole sidewall by the grinding portion. The grinding portion gradually engages the sidewall of a hole being drilled to prevent hesitation when the grinding stage of the operation commences. The relationship between the drill portion and the grinder portion also allows the triangular configuration of the drill portion to be continued along its axial extent to the interface with the grinder portion so that the support and centering of the bit is maintained during the transition between the hole producing and grinding stages of the operation.

The above-discussed and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of the preferred embodiment mounted in a drill press and positioned to drill a hole in a tubular duct.

FIG. 2 is an elevational view of the lower portion of the preferred embodiment penetrating the duct sidewall, with the duct sidewall shown in section.

FIG. 3 is like FIG. 2 except that it shows the frustoconical grinder portion in engagement with the hole produced by the drill portion.

FIG. 4 is like FIGS. 2 and 3 except that it shows the hole being finished by the reamer portion.

FIG. 5 is a sectional view taken along the line 5—5 in FIG. 3.

FIG. 6 is a front end view of the preferred embodiment shown in FIGS. 1-5.

FIG. 7 is a pictorial view of the bit shown in FIGS. 1-6.

FIG. 8 is an elevational view of the drill portion, the grinder portion, and the forward part of the reamer portion of a modified form of the preferred embodiment.

FIG. 9 is like FIG. 8 except that portions are shown in section to illustrate the connection between the drill portion and the grinder portion FIG. 10 is a pictorial view of the modified bit shown in FIGS. 8 and 9.

FIG. 11 is an exploded pictorial view of the bit shown in FIGS. 8-10.

FIG. 12 is a front end view of the bit shown in FIGS. 8-11.

BEST MODE FOR CARRYING OUT THE INVENTION

The drawings show bits 12, 12' that are constructed according to the invention and that also constitute the best mode of the invention currently known to the applicants. FIGS. 1-4 illustrate the bit 12 being used to produce and finish a hole in a fiber reinforced composite material anti-icing duct 4. It is anticipated that a primary use of the bit of the invention will be in drilling holes in the type of duct illustrated in FIGS. 1-4. However, it is of course to be understood that the bit of the invention may also be used to advantage in connection with drilling and finishing holes in other types of structures having various configurations and made from various materials.

FIGS. 1-7 show the preferred embodiment 12 of the bit of the invention. FIGS. 8-12 illustrate a modification 12' of the bit 12 which relates primarily to the manufacture of the bit 12', as opposed to its final configuration.

Referring to FIGS. 1-7, the bit 12 includes a drill portion 14, a frustoconical grinder portion 24, and a cylindrical reamer portion 28. A mounting shaft 32 is formed on the axially inner end of the bit 12 for mounting the bit 12 on drilling apparatus, such as the drill press 2 shown in FIG. 1. In the bit 12 shown in FIGS. 1-7, the drill portion 14, grinder portion 24, reamer portion 28, and mounting shaft 32 are coaxial and are integrally formed from micro-grain carbide.

The drill portion 14 of the bit 12 has a pointed tapered configuration and, at each point along its axial extent, a triangular cross section (FIG. 5). The cross section preferably has the shape of an equilateral triangle to maximize the automatic centering of the bit 12. The drill portion 14 has three longitudinal cutting edges 16 that define the three angles of the triangular cross section. Three equal flat faces 18 extend between adjacent cutting edges 16. The flat configuration of the faces 18 is preferred since it greatly simplifies the manufacture of the drill portion 14. However, the faces could also be concave or convex without departing from the spirit and scope of the invention. As used herein, the phrase "triangular cross section" is intended to include cross sections with concave and/or convex sides as well as those with straight sides. The cutting edges 16 and flat faces 18 extend axially inwardly and radially outwardly from the pointed tip of the drill portion 14 to its axially inner end. The maximum diameter of the drill portion 14 occurs at the axially inner end. As used herein, "diameter" in reference to the drill portion 14 refers to the diameter of a circle circumscribing the triangular cross section of the drill portion 14.

The grinder portion 24 of the bit 12 has a frustoconical configuration and extends axially inwardly and radially outwardly from the inner end of the drill portion 14. The outer end 26 of the grinder portion 24 which is axially and radially adjacent to the inner end of the drill portion 14 has a minimum diameter that is less than the maximum diameter of the drill portion 14. The grinder portion 24 increases in diameter in an axially inner direction and has at its inner end a maximum diameter that is greater than the maximum diameter of the drill portion 14. These relative diameters result in the bit 12 having an axially outer end with an arrowhead configuration. The arrowhead configuration allows the grinder portion 24 to gradually engage the sidewall of a hole to prevent hesitation when the grinding stage of a drilling operation commences.

The reamer portion 28 of the bit 12 is cylindrical and extends axially inwardly from the grinder portion 24. The cylindrical outer surface of the reamer portion 28 is an axially inward continuation of the frustoconical outer surface of the grinder portion 24. Therefore, the reamer portion 28 has along its axial length a diameter equal to the maximum diameter of the grinder portion 24.

The outer surfaces of the grinder portion 24 and reamer portion 28 are abrasive for enlarging and finishing a hole being drilled. The abrasive characteristic of the surfaces is preferably accomplished by plating or bonding diamond grit 30 onto the surfaces. In the currently preferred process of manufacture, diamond grit 30 is plated onto the outer grinder and reamer surfaces by a known copper plating procedure.

The angles of taper of the drill portion 14 and grinder portion 24 may have various values. These angles are indicated in FIG. 11. Currently, the preferred angle of taper A of the drill portion 14 is equal to the angle of taper B of the grinder portion 24. The preferred angle is 20°. This angle has been found to be suitable for drilling holes with diameters in the order of magnitude of 0.141 inch.

The bit 12' shown in FIGS. 8-12 has the same final configuration as the bit 12 shown in FIGS. 1-7. However, rather than being integrally formed, the drill portion 14' in the bit 12' is formed separately from the other portions of the bit 12'. The drill portion 14' is made from the same type of carbide that the bit 12 is made from and has a head with three cutting edges 16 joined by three flat faces 18. A mounting rod 20 extends axially inwardly from the working head of the drill portion 14', as shown in FIGS. 9-11. The grinder portion 24', reamer portion 28, and mounting shaft 32 of the modified bit 12' are formed in the same manner as the corresponding parts of the bit 12 except that they are made from mild steel rather than carbide and the axially outer end 26' of the grinder portion 24' has an opening 25 formed therein for receiving the mounting rod 20 of the drill portion 14'. The rod 20 is permanently brazed into place in the opening 25, as indicated at 22 in FIGS. 8 and 9.

The use of the bit 12 is illustrated in FIGS. 1-4. FIG. 1 shows the bit 12 in position ready to commence drilling a hole in the duct 4. The duct 4 has a diameter of about 2-4 inches. FIG. 2 illustrates the drill portion 14 penetrating the tube sidewall to produce a hole. As can be seen in FIG. 2, the initial drilling procedure causes delamination 6 and fiber breakout 8 adjacent to the hole. FIG. 3 illustrates the second stage of the drilling operation in which the grinder portion 24 enlarges the hole and smooths away the delaminations 6 and fiber breakout 8. FIG. 4 illustrates the final stage of the drilling operation in which the reamer portion 28 finishes the hole sidewalls to produce a smooth hole free of delaminations and the fiber breakout. Preferably, the tapers of the drill portion 14 and the grinder portion 24 and the minimum and maximum diameters are chosen in relation to the duct sidewall thickness so that the bit 12 is centered by the axially inner end of the drill portion 14 as the grinder portion 24 comes into engagement with the hole sidewall.

In tests conducted using the drill 12 to drill small holes in anti-icing ducts, the bit 12 has proved to be highly durable and reliable in forming high quality holes. In additional tests of larger bits having the configuration of the bits 12, 12' shown in the drawings, the bit of the invention has also proved to be even more useful than the preferred embodiments shown in the applicants' previous patent for producing larger holes. The bit of the present invention produces holes of even better quality than the previously preferred embodiment and has a much longer life than the previously preferred embodiment. Preliminary tests indicate that the bit of the invention can also be used to drill heavy walled (up to ½ inch thick) graphite/epoxy composite materials.

It will be obvious to those skilled in the art to which this invention is addressed, that the invention may be used to advantage in a variety of situations. Therefore, it is intended to be understood by those skilled in the art that various modifications and omissions in form and detail may be made without departing from the spirit and scope of the invention as defined by the following claims.

What is claimed is:

1. A bit for forming holes defined by sidewalls, said bit comprising:
   a pointed tapered drill portion having a longitudinal axis, and including three longitudinal cutting edges for producing a hole; said drill portion extending along said axis; said drill portion having, at each point along said axis, an essentially equilateral triangular cross section with three angles defined by said cutting edges; and said drill portion having an axially inner end and a first maximum diameter at said axially inner end; and
   a grinder portion including a generally frustoconical abrasive outer surface portion extending generally axially inwardly from the drill portion for enlarging the hole, said grinder portion having a second maximum diameter larger than said first maximum diameter, and a minimum diameter less than said first maximum diameter; and said grinder portion increasing in diameter in an axially inward direction from said minimum diameter radially adjacent to said inner end of the drill portion, to said second maximum diameter, to cause the abrasive outer surface portion of the grinder portion to gradually engage said sidewalls of holes.

2. The bit of claim 1, further comprising a reamer portion including an essentially cylindrical abrasive outer surface portion that is an axially inward continuation of said surface portion of the grinder portion for finishing the hole.

3. The bit of claim 1, in which said cross section has straight sides between said angles.

* * * * *

UNITED STATES PATENT AND TRADEMARK OFFICE
CERTIFICATE OF CORRECTION

PATENT NO. : 5,000,630
DATED : March 19, 1991
INVENTOR(S) : A. Douglass Riley and Rene F. DeFries It is certified that error appears in the above-identified patent and that said Letters Patent is hereby corrected as shown below:

On the cover page, under "FOREIGN PATENT DOCUMENTS",
    No. "235,348" should have been listed as originating in
    -- Germany --, not "Switzerland".

Col. 5, line 30, there is a period after "portion".

Signed and Sealed this

First Day of September, 1992

Attest:

DOUGLAS B. COMER

*Attesting Officer*      *Acting Commissioner of Patents and Trademarks*